United States Patent
Krishnamurthy et al.

(10) Patent No.: US 6,912,562 B1
(45) Date of Patent: Jun. 28, 2005

(54) CACHE INVALIDATION TECHNIQUE WITH SPURIOUS RESOURCE CHANGE INDICATIONS

(75) Inventors: Balachander Krishnamurthy, New York, NY (US); Michael Rabinovich, Gillette, NJ (US)

(73) Assignee: AT&T Corp., New York, NY (US)

( * ) Notice: Subject to any disclaimer, the term of this patent is extended or adjusted under 35 U.S.C. 154(b) by 271 days.

(21) Appl. No.: 10/339,687

(22) Filed: Jan. 13, 2003

Related U.S. Application Data

(60) Provisional application No. 60/430,853, filed on Dec. 4, 2002.

(51) Int. Cl.$^7$ ............................ G06F 15/16; G06F 12/00
(52) U.S. Cl. ........................ 709/203; 709/229; 711/133; 711/144
(58) Field of Search ................................ 709/203, 229; 711/133, 144

(56) References Cited

U.S. PATENT DOCUMENTS 6,578,113 B2 * 6/2003 Krishnamurthy et al. ... 711/141

OTHER PUBLICATIONS

B. Krishnamurthy and C. Wills, "Piggyback Server Invalifation for Proxy Cache Coherency," Proceedings of the WWW-7 Conference, Brisbane, Australia, Apr. 1998, pp. 185–194.

J. Dilley et al., "The Distributed Object consistency Protocol," Technical Report HPL-1999-109, Hewlett-Packard Labs, 1999.

R. Tewari et al., "WCDP: A Protocol for Web Cache Consistency," 7$^{th}$ International Workshop on Web Content Caching and Distribution (WCW), 2002.

* cited by examiner

Primary Examiner—Reginald G. Bragdon
(74) Attorney, Agent, or Firm—Ronald D. Slusky

(57) ABSTRACT

A Web server maintains, for one or more resources, a respective list of clients who requested that resource. The server takes on the responsibility of notifying all of those clients on when the resource in question changes, thereby letting them know that if the resource is again asked for by a user, an updated copy will have to be requested from the origin server. The server thereupon purges the client list, and then begins rebuilding it as subsequent requests come in for the resource in question. Invalidation messages are sent to selected "victim" clients on the client list, independent of whether the resource in question has changed, when the list meets a predetermined criterion, such as becoming too large. The victim clients may include clients who access the server less frequently than others, clients who have accessed the server in the more distant past than other clients, i.e., using a first-in-first methodology, or clients who have not subscribed to a service that keeps them from being victim clients. Review of a client list to determine whether it meets the selected criterion can be invoked every time a client gets added to a client list or on a scheduled basis.

47 Claims, 3 Drawing Sheets

CACHE INVALIDATION TECHNIQUE WITH SPURIOUS RESOURCE CHANGE INDICATIONS

CROSS-REFERENCE TO RELATED APPLICATIONS

This application claims the benefit of U.S. Provisional Application No. 60/430,853, filed Dec. 4, 2002.

BACKGROUND OF THE INVENTION

The present invention relates to cache invalidation techniques such as ones used by Web servers that supply information over the World Wide Web ("Web").

Pages of information or other resources, such as images, sent, or transmitted, to a client from a Web server are typically stored in a Web cache once they are downloaded so that if a particular resource is requested a subsequent time, it can be re-presented to the client without the server having to be re-contacted. A familiar example of such an operation occurs when a PC user clicks on the "back" button of his Web browser, whereupon the browser retrieves a previously displayed page from a cache that may be maintained, for example, by the PC itself, by a proxy server to which the PC is connected via a local area network, or by an Internet service provider such as AT&T WorldNet Service.

Before delivering, or "serving," a cached copy of a resource, a Web cache should ensure that it is consistent with (i.e., the same as) the copy then existing on the origin server, i.e., the server that had provided the resource. Otherwise, a client behind the cache may get a stale copy of the resource. If the origin server knows how long a resource will be good for (e.g., a daily newspaper generated each morning and deemed valid for 24 hours) it can provide the client with an explicit expiration time. If a user requests the resource after the expiration time, the client knows to ask the origin server for a fresh copy but otherwise it does not need to do so.

More commonly, however, the resource has no explicitly expressed expiration time, in which case there are two basic approaches for ensuring that an up-to-date copy of a resource is provided to the client.

The first approach is called client validation. The client treats a resource as potentially out-of-date on each request for the resource and sends to the origin server a cache validation request in the form of an If-Not-Modified header with each access. If the resource has not been modified since it was last sent to the requester, the server returns a so-called "304 Not Modified" status code response, thereby informing the requester that the cached copy is still good. This approach obviates the need for the server to re-transmit a resource that has not changed. However, it is still quite consumptive of Web resources; studies have shown that 20–30% of all requests on the Web are cache validation requests. Moreover, client validation can be quite inefficient if a resource is asked for a great deal but does not change often.

The second approach, referred to as server invalidation, addresses these concerns. Here, the origin server maintains, for one or more resources, a respective list of clients who requested that resource. The server takes on the responsibility of sending a so-called invalidation message to those clients when the resource in question changes, thereby letting them know that a newer version of the resource is available to be served from the server and that if the resource is again asked for by a user, an updated copy should thus be requested from the origin server because the resource has changed since it was served to the clients on the list. The server thereupon purges the client list, and then begins rebuilding it as subsequent requests come in for the resource in question. In the meantime, the server will have effectively made the clients aware that server invalidation is in effect for a resource by, for example, specifying an expiration time that is relatively far in the future, so that the clients will continue to use their cached copies until receiving an invalidation message. When an invalidation message is received by a client, the client flushes these items from its cache. Several protocols for sending such invalidation messages have been proposed See, for example, Balachander Krishnamurthy and Craig Wills, "Piggyback Server Invalidation for Proxy Cache Coherency," *Proceedings of the WWW-7 Conference*, Brisbane, Australia, pp. 185–194, April 1998; Renu Tewari, Thirumale Niranjan, Srikanth Ramamurthy (IBM Research), "WCDP: A Protocol for Web Cache Consistency," *7th International Workshop on Web Content Caching and Distribution (WCW)*; and John Dilley and Martin Arlitt and Stephane Perret and Tai Jin, "The Distributed Object Consistency Protocol," *Technical Report HPL*-1999-109, Hewlett-Packard Labs, 1999.

Server invalidation greatly reduces the amount of Web traffic devoted to validation requests. However, it becomes unwieldy for a server when the number of clients on a list becomes very large because it results in a potentially inordinate amount of state maintenance on the part of the Web server. One solution for keeping the client list manageable is to implement server invalidation only for clients who are deemed "important" for one reason or another, such as clients who have explicitly subscribed to (and paid for) such a service. However, this leaves all other clients with having to issue client validation requests. Depending on the popularity of the resource, this could still result in a large volume of client validation requests and responses criss-crossing the Web, as well as consuming server resources.

SUMMARY OF THE INVENTION

The present invention is directed to a technique that, in large part, preserves the advantages of server invalidation, while keeping the client list to a manageable size. In accordance with the invention, invalidation messages are sent to selected clients on the client list as a function of a particular characteristic of the client list, such as when the number of clients on the list has become too large, such invalidation messages being sent even though the particular resource in question did not change subsequent to it having been served to those particular clients. We refer to these as "spurious" invalidation messages in that, contrary to what the invalidation message typically is understood to mean, the server is still responding to requests for the particular resource by serving the previously-served version. The selected clients can then safely be deleted from the client list because all this means is that the next time that a user of such a client requests the resource, a copy is requested directly from the origin server.

A "cost" of this approach is that it generates a certain amount of unnecessary Web traffic in the form of spurious invalidation messages and subsequent validation requests from the client. That cost is not as great as might be thought, however, because the deleted client's access request will still include the If-Not-Modified header. Thus if the resource has not actually changed, the origin server will provide a 304 Not Modified response, thereby inducing the client to use its currently cached copy.

Any one or more criteria can be used to identify those clients on the client list that are to be deleted, as described in detail hereinbelow.

DETAILED DESCRIPTION OF AN ILLUSTRATIVE EMBODIMENT

Figure 1:
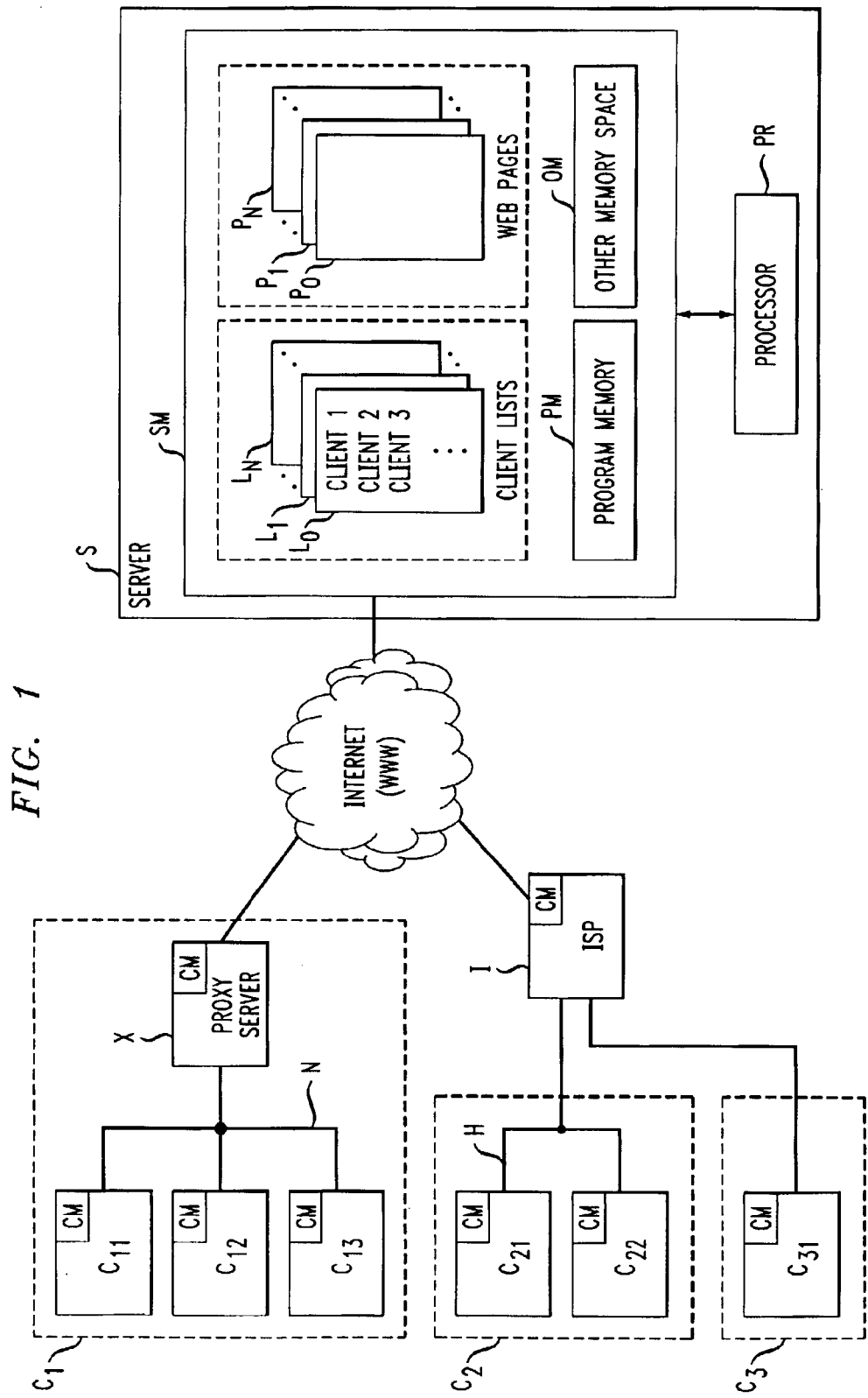
FIG. 1 shows a client/server arrangement wherein the server maintains a client list in order to implement Web server invalidation.

The client/server arrangement in FIG. 1 shows a Web server S illustratively connected to the Internet. Server S includes a processor PR and memory SM. Memory SM includes a program memory PM comprising a machine-accessible medium having instructions encoded thereon for enabling the server to carry out its various operations, those operations including those functions that implement the present invention. Memory SM also includes other memory space OM in which data and other information necessary for the operation of the server are stored.

Also stored with memory SM of server S are Web pages $P_0, P_1 \ldots P_N$, which can be accessed via the Internet by various clients, which are, for example, personal computers or workstations. These are pages for which server invalidation is in effect. Whenever these pages are served, they are assigned an expiration time, which is made known to the requesting clients as part of the protocol by which the page was communicated. The expiration time is chosen without regard to whether, or when, the page is expected to actually change. Rather, it is chosen to be a time sufficiently far in the future that clients will continue to regard their cached copy of the page as valid for a significant amount of time after they received it, without requesting a fresh copy from the origin server. For example, the expiration time could be set to be one week in the future. Moreover, the clients must be configured to be able to accept and understand invalidation messages using an appropriate protocol between clients and servers, such as one of the protocols proposed in the above-cited technical articles.

Although this description describes the illustrative embodiment with reference to Web pages, it will be appreciated that the invention is equally applicable to other resources that may be supplied over the Web, other portions of the Internet, or, indeed, other networks that may currently exist or may exist in the future.

The clients, more particularly, comprise a first cluster $C_1$ of clients $c_{11}, c_{12}$ and $c_{13}$ which are illustratively installed on the premises of a business. They are connected to the Internet via a local area network N and a proxy server X. Although cluster $C_1$ is shown as having only three clients, it will be appreciated that the number of clients could be much larger.

Another cluster of clients is cluster $C_2$ comprising clients $c_{21}$ and $c_{22}$. These are illustratively two personal computers connected to the Internet via a home network H and an Internet service provider I, such as AT&T WorldNet Service. Another cluster is cluster $C_3$ comprising a single client $c_{31}$ also connected to the Internet via the Internet service provider.

As further shown in FIG. 1., a Web cache CM is maintained within each client, within proxy server X and within Internet service provider I.

Figure 2:
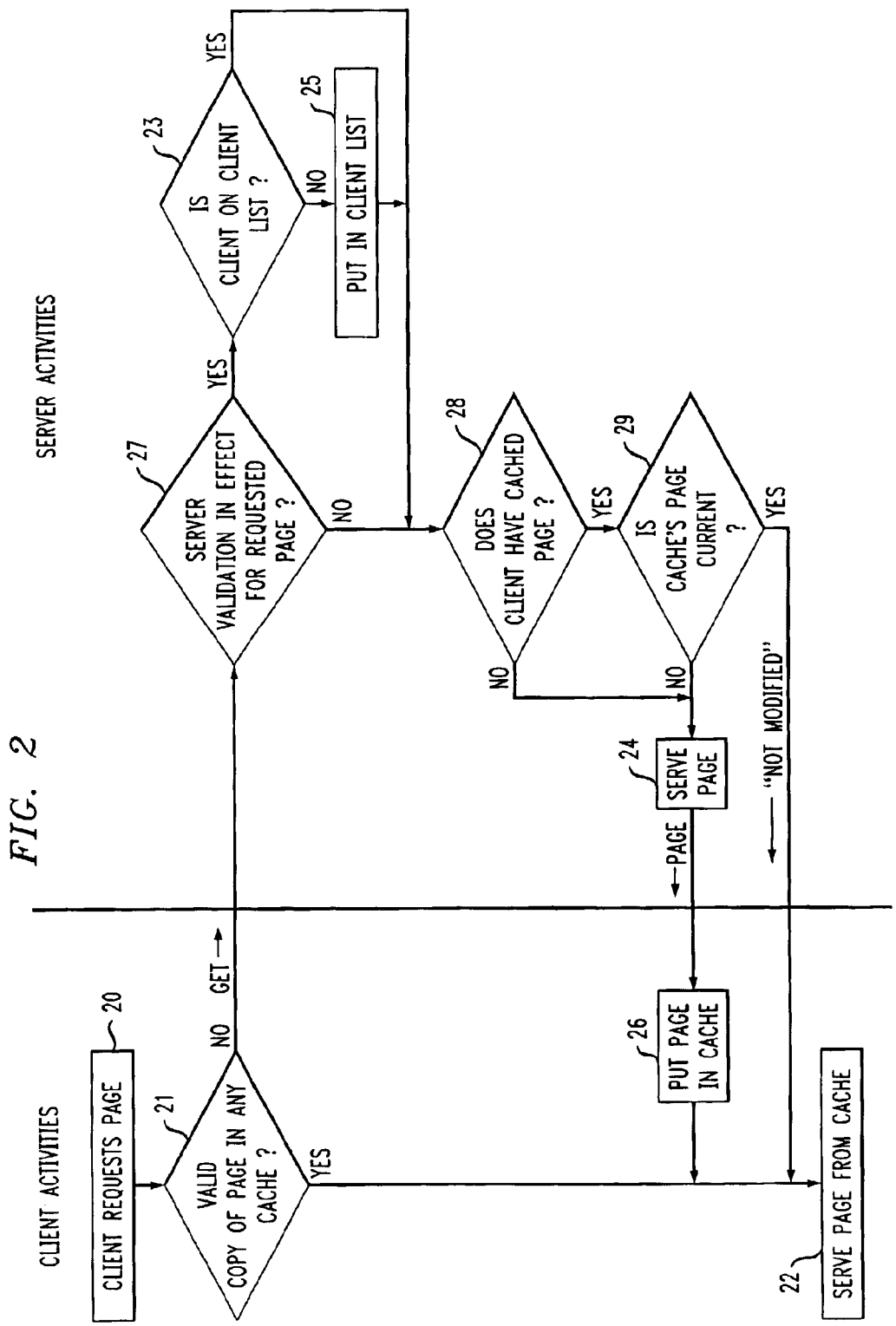
FIG. 2 is a flowchart showing the functions performed by a client and the server in the arrangement of FIG. 1 when the client has received a request from a user for a particular resource.

As shown in FIG. 2, assume that a user desires to view a particular page held in server S, as indicated at 20, and to that end enters the URL for that page in the appropriate window of his/her browser. Pages transmitted, or "served" to a client will have been stored within one or more of caches CM. Thus it is determined at 21 whether there is a copy of the requested page in one or the other of these caches and, if so, whether the page is valid. A copy will be deemed valid if it has an expiration time that has not yet occurred. In this or any other situation where it is determined that there is a valid page available in a cache, then the page is served from the cache, as indicated at 22, and nothing further need be done.

On the other hand, there may be no known-to-be-valid copy of the requested page in any cache. For example, there may be no copy at all. Or the cache may be holding a copy of the page but its validity is unknown. In either case, a GET request is sent to server S.

Server S maintains client lists $L_0, L_1 \ldots L_N$ associated with pages $P_0, P_1 \ldots P_N$, respectively. Whenever a particular page is requested by a client, that client is added to the list associated with the requested page if the client is not already listed therein. As an example, clients client1, client2, client3 . . . are presently listed in list $L_0$ associated with page $P_0$. The clients on a given client list are the entities that actually requested the page in question, which in this example would be proxy X or ISP I. In a situation where there is no intermediate cache between the server and, say, a workstation, then, of course, the workstation itself would be the entity listed on the client list.

Pages $P_0, P_1 \ldots P_N$ are not necessarily all of the pages stored in server S; many pages stored therein may be accessed so infrequently, or may change so infrequently, that the overhead associated with maintaining a client list for such pages is not justified. Thus upon receiving the GET request, the server first determines, at 27, whether server invalidation is in effect for the requested page, i.e., whether there is an associated client list. If not, then the GET request is handled in the conventional way for pages subject to client, rather than server, validation. That is, if the client did have a copy of the page but did not know if it was still valid, it would have included an If-Not-Modified header in the request. It is thus determined at 28 whether the client does have a cached copy of the page, which would be the case if the GET request had included an If-Not-Modified header in the request. If the client does not have the page at all, then a current copy is served, as indicated at 24, along with an assigned expiration time, as noted above. If the client does have a current copy but (based on information supplied from the client in the request) the server has determined that the page is not current, then, again a current copy is served. Otherwise, a "304 Not Modified" message is sent and the copy currently stored in cache is served at 22.

Returning back to 27, it may be determined that server invalidation is, in fact, in effect for this page. In that case, it is thereupon determined at 23 whether the requesting client is already on the client list for the requested page in question. If not, the client is added to the list at 25.

Even if the expiration time for a page has passed, a client requesting that page will transmit an If-Not-Modified header along with the request because the page may actually not have changed. This is true even when client validation is in effect for a page, and is certainly true in arrangements embodying the principles of the invention since a client may have received a spurious invalidation message as described below. In that case, the version of the page that is currently cached by such a client may, in fact, still be valid. Thus it is again determined at 28 and 29 whether the client has a cached page and if so, whether it is valid and either the actual requested page, or a 304 Not Modified message is sent.

Whenever the page is served as indicated at 24, the requesting client stores a copy in its cache CM, as indicated at 26, and then, as before, the page is served from the cache, as indicated at 22. While on its way to the client, the page is also stored in other caches in the communication stream, such as the caches in proxy server X or Internet service provider I.

Figure 3:
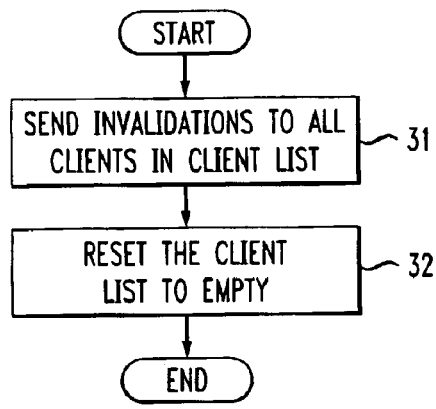
FIG. 3 is a flowchart showing the processes performed by the server when a resource has changed, e.g., the contents of a Web page have been updated.

FIG. 3 indicates the processing carried out by server S whenever there is a change in the contents of a particular page for which server invalidation is in effect. The processing is in two steps. First, server S sends invalidation messages to all clients in the client list associated with that page, as indicated at 31. This ensures that all clients on the list will be caused to request a fresh copy of the page in question via the "no" branch emanating from decision box 21 in FIG. 2 if and when a user asks for it to be re-displayed. The client list is then reset to "empty," i.e., its contents purged, as indicated at 32.

Figure 4:
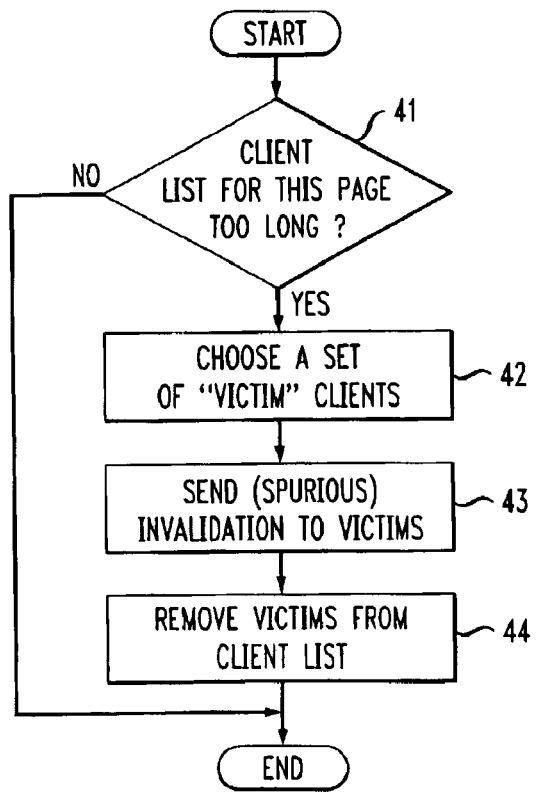
FIG. 4 is a flowchart showing the processes performed by the server, in accordance with the principles of the invention, in order to maintain the client list at a desired size.

FIG. 4 shows the processing carried out in server S to maintain the client list at substantially no greater than a desired maximum number of clients on the list pursuant to the principles of the invention. That maximum can vary from page to page. This processing, referred to herein as "client list review," is carried out for each page (or for each volume of pages, as noted below) individually. In particular, the server determines, at 41, whether the client list for the page in question has become longer than a predefined limit, i.e., the desired maximum. If not, there is nothing more to be done. If the client list has become too long, at least one "victim" client, and preferably a number of victim clients, is selected for deletion, as indicated at 42, using any of a number of possible criteria.

In particular, victim clients may be those who have accessed this server less frequently than others over some period of time. This approach would tend to minimize the amount of Web traffic devoted to access request messages since it is reasonable to assume that clients who have shown an interest in pages stored on the server in question by accessing it relatively frequently are more likely to do so again than clients who access it less frequently. Thus the clients who access the server more frequently are the ones that one would not want to send spurious invalidation messages to since that would likely engender a great many new access requests.

Another criterion might simply be first-in, first-out. A client that accessed a page at a more distant time in the past than at least one other client on the client list will be deleted first.

Yet another approach is to sell subscriptions; a client may be willing to pay a fee to be kept on the client list and thus not be the recipient of spurious invalidation messages, in which case the server will select as victims only clients not on a subscription list.

In addition, it may be desired to preclude clients from being victims based on information about the client including, for example, the nature of the client's access behavior, or the quality of the client's connectivity with the server measured, for example, in teens of round-trip time, bandwidth or network congestion. See, for example, Balachander Krishnamurthy and Craig E. Wills, "Improving Web Performance by Client Characterization Driven Server Adaptation" WWW2002, May 7–11, Honolulu Hi.

As indicated at 43, the victim clients are then sent invalidation messages. These are actually spurious since the basis for sending the message was not that the page in question is no longer valid but only that the client list had become too long. And then, as indicated at 44, the selected victim clients are removed from the client list.

Server S may be triggered to carry out the client list review processing of FIG. 4 in any of various ways. For example, client list review can be invoked every time a client gets added to a client list. Another approach is to perform a client list review for each list on a scheduled basis. Although certainly effective to keep the client lists from growing much, if at all, beyond a desired nominal maximum length, these approaches utilize a great deal of processor resources and quite often the client list review will prove to have been unnecessary because it is expected that with this approach many client lists will probably not have been found to be longer than the prescribed maximum for any given list review. A more sophisticated approach would be one in which client list review is invoked more frequently for pages that are accessed more frequently since it is their client lists that are more likely to grow faster. (A page may also be requested many times by the same client, so it is not guaranteed that different clients are involved any time a page is popular. In such a situation, however, the only "harm" done would be that client list review processing might be undertaken for a page a little more often than necessary.) For example, one could invoke a round of client list reviews periodically and, upon doing so, begin by considering the pages that had the most accesses since the last time such a round of reviews was undertaken. The entire set of client lists could be gone through each time. Or the process may be terminated early if, for example, upon reducing the length of some of the lists, it is seen that the total amount of server memory allocated to client lists is at an acceptably low level. In addition, the use of server processing resources for client list review can be made more efficient by using a so-called exponential backoff approach wherein the client list review is performed at variable time intervals that are dependent upon whether said client list was found to exceed the specified limit for any given client list review. In particular, the time interval between one review and the next for a given page is made increasingly longer every time a review is made and it is found that the list is not too long. Conversely, the time interval between one review and the next for a given page is made increasingly shorter every time a review is made and it is found that the list is too long and had to be shortened.

Note that even if the length of a list remains above the prescribed maximum for a period of time, e.g., because the client list happens to grow very quickly between client list reviews for a given resource, there is no harm done since the server will typically have enough extra memory to take this into account.

Instead of maintaining separate client lists for particular pages, a single list could be maintained for a so-called volume of pages, i.e., a group of pages that tend to get accessed all together, such as when a set of links is embedded in a page. In such a case, a client would be added to the list whenever it had accessed any of the pages within the volume.

It may be desirable to not even put some clients on the client list. Spiders and offline browsers are examples.

Certainly, on the one hand, if a server were to tell a spider when its resources changed, then the spider would not have to visit that site until then. However, spiders will not want validations from the millions of Web sites that they visit and it would be preferable for a server not to send invalidations to spiders. The fact that a client is, in fact, a spider or an offline browser can, in fact, be determined based on its access pattern. See, for example, Balachander Krishnamurthy, Jennifer Rexford, Web Protocols and Practice: HTTP/1.1, Networking Protocols, Caching, and Traffic Measurement, Addison-Wesley Pub Co; p. 65, 1st edition (May 4, 2001) and Balachander Krishnamurthy and Jia Wang, "On Network-Aware Clustering of Web Clients," Proceedings of ACM SIGCOMM 2000, Stockholm, Sweden, p. 11, August 2000. See also, Almeida et al. "Analyzing Web robots and their impact on caching", 6th Web Content Caching and Distribution Workshop (WCW), Elsevier 2001, pp. 249–265.

It should be understood that in general there may be a wide range of different criteria and combinations of those criteria that a server might use to decide how to go about sending out invalidations, how frequently to undertake a client list review etc. One such criterion beyond those already mentioned herein may be the content type of the resource and how often they change. For example, static image types, such as .jpg and .gif almost never change, but others may change relatively often. Keeping in mind that any change in a resource causes the client list to be reset to empty, it will be appreciated that the client list will not tend to become unduly large if the associated resource changes frequently. Thus the frequency with which client list review is undertaken can be controlled or selected as a function of how often the resource changes. In particular, all other things being equal, the client list review could be scheduled to occur less often for resources that change relatively frequently compared to other resources. Another valid criterion in deciding how frequently to review the client list for victims is the ratio of access rate from unique clients relative to the rate of change of the resource. If this ratio is high, the client list may grow quickly and we might need to review the client list for victims more often. The topic of the rate of change of resources is addressed in Fred Douglis, Anja Feldmann, Balachander Krishnamurthy, Jeffrey Mogul, "Rate of Change and other Metrics: a Live Study of the WWW," *Proceedings of the* 1997 *USENIX Symposium on Internet Technology and Systems*, Monterey, Calif., pp. 147–158, December 1997.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

In the flowcharts hereof, the various boxes are intended to represent not only process or method steps, but also, alternatively, modules of program code, stored within program memory PM within server S, within an individual client, or within or other equipment. Those program modules when executed, carry out the functions necessary to effectuate the operations associated with the respective box(es) of the flowchart.

The foregoing merely illustrates the principles of the invention and many variations are possible. It will thus be appreciated that those skilled in the art will be able to devise various arrangements which, although not explicitly described or shown herein, embody the principles of the invention and are included within their spirit and scope.

What is claimed is:

1. A server invalidation method for use by a server that maintains a client list for a resource, the method comprising transmitting an invalidation message for said resource to at least one of the clients on said client list, said invalidation message being transmitted even though said resource did not change subsequent to said resource having been served to said client.

2. The invention of claim 1 wherein said invalidation message is a spurious indication that said resource has changed.

3. The invention of claim 2 further comprising removing said at least one of said clients from said client list.

4. The invention of claim 3 wherein said transmitting is performed as a function of a particular characteristic of said client list.

5. The invention of claim 4 wherein said particular characteristic is the number of clients on said client list.

6. The invention of claim 1 further comprising identifying, as said at least one of said clients, a client on said client list which, over some period of time, has accessed said server less frequently than at least one other client on said client list.

7. The invention of claim 1 wherein said at least one of said clients is a client identified on the basis of information about that client.

8. The invention of claim 7 wherein said information about the client is the nature of the client's access behavior.

9. The invention of claim 7 wherein said information about the client is the quality of the client's connectivity with said server.

10. The invention of claim 1 further comprising identifying, as said at least one of said clients, a client on said client list which last accessed said server at a more distant time in the past than at least one other client on said client list.

11. The invention of claim 1 further comprising:
    maintaining a list of clients that are not to receive said invalidation message,
    and wherein said at least one of said clients is a client not on that list.

12. A method for use by a server that serves at least one resource, the method comprising:
    maintaining a list of clients to whom a particular version of a resource was sent by said server, and
    transmitting to at least one of said clients on said client list an invalidation message indicative of the fact that a newer version of said resource is available to be served by said server, said invalidation message being transmitted even though said server is still responding to requests for said resource by serving said particular version of said resource.

13. The invention of claim 12 further comprising removing said at least one of said clients from said client list.

14. The invention of claim 13 wherein said transmitting is performed in response to a determination made during a review of said client list that the number of clients on said client list exceeds a specified limit.

15. The invention of claim 14 wherein said client list review is undertaken in response to a client being added to said client list.

16. The invention of claim 14 wherein said client list review is undertaken on a scheduled basis.

17. The invention of claim 16 wherein said client list review is undertaken more frequently for a client list whose associated resource is accessed more frequently than for client lists associated with other resources served by said server.

18. The invention of claim 14 wherein said server performs said client list review at variable time intervals that are dependent upon whether said client list was found to exceed said specified limit for any given client list review.

19. The invention of claim 14 further comprising, in response to a newer version of said resource being made available to be served on said server,
    transmitting said invalidation message to all of the clients on said client list, and
    removing all of the clients from said client list.

20. A method for use by a server comprising:
    maintaining client lists each associated with a respective one of a plurality of resources,
    responding to a request from a client for an individual one of said resources by a) causing the requested resource to be served to said client, b) placing said client on a particular client list, said particular client list being the list associated with the requested resource, and c) causing said client to thereafter utilize a cached copy of the requested resource without fist determining from said server whether said requested resource had changed,
    responsive to there being a change in said resource a) sending an invalidation message to at least ones of the clients on said particular client list, said invalidation message being indicative of the fact that the resource has changed since it was served to said at least ones of said clients and b) removing said at least ones of said clients from said particular client list, and
    sending an invalidation message to at least one of the clients on said particular client list in response to said particular client list meeting a predetermined criterion.

21. The invention of claim 20 wherein said causing said client to thereafter utilize a cached copy of the requested resource comprises communicating an expiration time for said resource to said client.

22. The invention of claim 20 wherein said predetermined criterion is that the number of clients on said client list exceeds a predefined limit.

23. The invention of claim 22 further comprising identifying, as said at least one of said clients, a client on said client list which, over some period of time, has accessed said server less frequently than at least one other client on said client list.

24. The invention of claim 22 further comprising identifying, as said at least one of said clients, a client on said client list which last accessed said server at a more distant time in the past than at least one other client on said client list.

25. The invention of claim 22 wherein said at least one of said clients is a client identified on the basis of information about that client.

26. The invention of claim 25 wherein said information about the client is the nature of the client's access behavior.

27. The invention of claim 25 wherein said information about the client is the quality of the client's connectivity with said server.

28. The invention of claim 22 further comprising:
    maintaining a list of clients that are not to receive said invalidation message,
    and wherein said at least one of said clients is a client not on that list.

29. The invention of claim 22 wherein it is determined whether said predetermined criterion is met during a client list review undertaken in response to a client being added to said client list.

30. The invention of claim 22 wherein it is determined whether said predetermined criterion is met during a client list review undertaken on a scheduled basis.

31. The invention of claim 30 wherein a frequency with which said client list review is undertaken is a function of a frequency with which the associated resource is accessed.

32. The invention of claim 30 wherein a frequency with which said client list review is undertaken is a function of a rate of change of the associated resource.

33. The invention of claim 30 wherein said client list review is undertaken at variable time intervals that are dependent upon whether said client list was found to exceed said specified limit for any given client list review.

34. An article of manufacture, comprising a machine accessible medium having instructions encoded thereon for enabling a server that serves at least one resource to perform the operations of:
    maintaining a list of clients to whom a particular version of a resource was sent by said server, and
    transmitting to at least one of said clients on said client list an invalidation message indicative of the fact that a newer version of said resource is available to be served from said server, said invalidation message being transmitted even though said server is still responding to requests from said particular resource by serving said particular version of said resource.

35. The invention of claim 34 wherein said instructions further enable said server to perform the operation of removing said at least one of said clients from said client list.

36. The invention of claim 35 wherein said transmitting is performed in response to a determination that the number of clients on said client list exceeds a specified limit.

37. The invention of claim 36 wherein said instructions further enable said server, in response to a newer version of said resource being made available to be served from said server, to perform the further operations of:
    transmitting said invalidation message to all of the clients on said client list, and
    removing all of the clients from said client list.

38. A server adapted to:
    maintain a client list associated with each of a plurality of resources,
    respond to a request from a client for an individual one of said resources by a) causing the requested resource to be served to said client and b) placing said client on a particular client list, said particular client list being the list associated with the requested resource,
    in response to there being a change in said resource a) send an invalidation message to at least ones of the clients on said particular client list, said invalidation message being indicative of the fact that the resource has changed since it was served to said at least ones of said clients and b) remove said at least ones of said clients from said particular client list, and
    send an invalidation message to at least one of the clients on said particular client list in response to said particular client list meeting a predetermined criterion.

39. The invention of claim 38 wherein said predetermined criterion is that the number of clients on said client list exceeds a predefined limit.

40. The invention of claim 38 wherein said server is further adapted to send to said client, when said resource is served to said client, information indicating that said resource will be valid for at least a specified amount of time.

41. The invention of claim 38 wherein said server is further adapted to identify, as said at least one of said clients, a client on said client list which, over some period of time, has accessed said server less frequently than at least one other client on said client list.

42. The invention of claim 38 wherein said server is further adapted to identify, as said at least one of said clients, a client on said client list which last accessed said server at a more distant time in the past than at least one other client on said client list.

43. The invention of claim 38 wherein said server is further adapted to maintain a list of clients that are not to receive said invalidation message, and wherein said at least one of said clients is a client not on that list.

44. The invention of claim 38 wherein it is determined whether said predetermined criterion is met during a client list review undertaken in response to a client being added to said client list.

45. The invention of claim 38 wherein it is determined whether said predetermined criterion is met during a client list review undertaken on a scheduled basis.

46. The invention of claim 45 wherein said client list review is undertaken more frequently for a client list whose associated resource is accessed more frequently than for client lists associated with other resources served by said server.

47. The invention of claim 45 wherein said client list review is undertaken at variable time intervals that are dependent upon whether said client list was found to exceed said specified limit for any given client list review.

\* \* \* \* \*